INVENTOR
CARL J. DEMRICK

BY Olsen & Stephenson

ATTORNEYS

FIG. 3

INVENTOR
CARL J. DEMRICK

INVENTOR
CARL J. DEMRICK
BY Olsen & Stephenson
ATTORNEYS

United States Patent Office 3,369,282
Patented Feb. 20, 1968

3,369,282
APPARATUS FOR MAKING STEEL WOOL SCOURING PAD
Carl J. Demrick, 6375 Golfview Drive,
Birmingham, Mich. 48010
Original application June 14, 1965, Ser. No. 463,736.
Divided and this application May 11, 1967, Ser.
No. 637,839
10 Claims. (Cl. 29—4.5)

ABSTRACT OF THE DISCLOSURE

An apparatus for making steel wool scouring pads in which a continuous ribbon of steel wool is torn into individual strips, which strips are then coiled into rolls with alternate rolls being compressed and pinched around their peripheries by alternate punch presses which have die sets and die actuators for performing these operations of shaping the pads.

*Cross reference to related application*

This application is a division of prior application, Ser. No. 463,736, filed June 14, 1965.

*Background of the invention*

Various methods and apparatuses have been used to fabricate scouring pads from fibrous material such as steel wool. One type of steel wool pad is made from a continuous ribbon of steel wool which is first separated into individual strips. Each strip is then formed into a roll and each roll is compressed radially in a die, that is, compressed in a direction perpendicular to the axis of the roll, and simultaneously pinched around a peripheral margin of the roll to form a finished pad. Soap may be introduced into the steel wool during fabrication of the pad in various ways such as by dipping the ribbon into a tank of liquid soap, injecting soap into the form pad by means of a needle, and passing liquid soap through the formed steel wool pad. During fabrication of pads in this manner it is necessary to handle the steel wool mechanically, particularly when the roll is fed into the die before compacting and when the finished pad is ejected from the die. In prior art apparatus it is not uncommon for individual strands or groups of strands of steel wool to catch on the material handling apparatus leaving ragged tails on the finished pad which detract from the appearance of the finished pad and impair the utility of the pad to some extent. The problem of ragged pads and tails is also due in part to loose ends of each steel wool strip which are not blended evenly and smoothly into the outer convolution of the roll since these loose ends are likely to catch on the material handling and die press apparatus. The problem is also increased where a roll of steel wool which has a rectangular cross section must be pushed into a round die. Bulky and complicated equipment capable only of low production has also hampered the effective production of scouring pads.

*Summary of the invention*

This invention contemplates making fibrous pads by an apparatus that eliminates rough and excessive material handling steps; that minimizes the likelihood of ragged finished pads and loose tails on the finished pads; that is simple, economical and effective in operation and construction; and that achieves high production of good quality pads.

According to one form of the present invention, an apparatus for making steel wool pads is provided having a first station for receiving a continuous ribbon of steel wool and for tearing such continuous ribbon into a series of strips which are fed to a second station. At the second station the series of strips are sequentially formed into individual rolls which are transferred to a third station. At the third station the rolls are formed and compressed into pads of desired size and shape. If desired, soap or other materials may be applied to the ribbon during the operation of the apparatus, and such soap or other materials can be sprayed onto the ribbon, applied thereto in the form of a solid gob, or the like. Normally, such operations of adding materials to the pad will occur in the vicinity of the first station, prior to forming the rolls.

Other objects, features and advantages of the present invention will become apparent in connection with the accompanying description, claims, and drawings in which:

Figure 1:
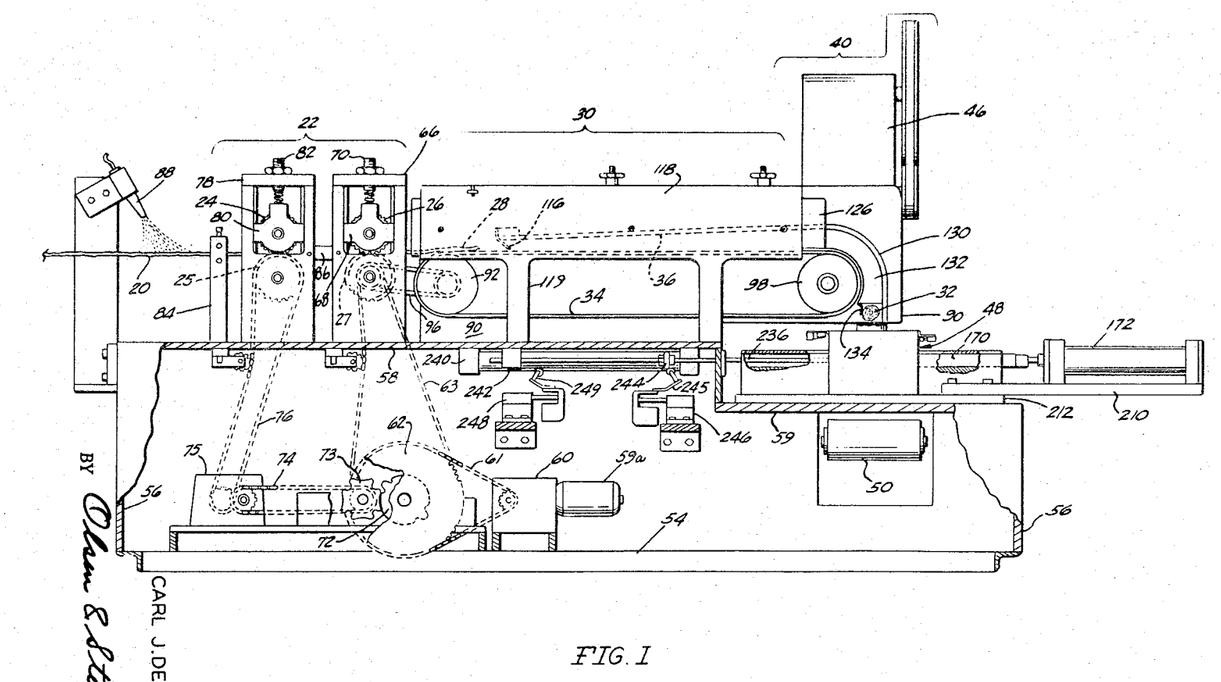
FIGURE 1 is a side elevation with certain parts removed or broken away to illustrate a machine constructed in accordance with the present invention.
Figure 2A:
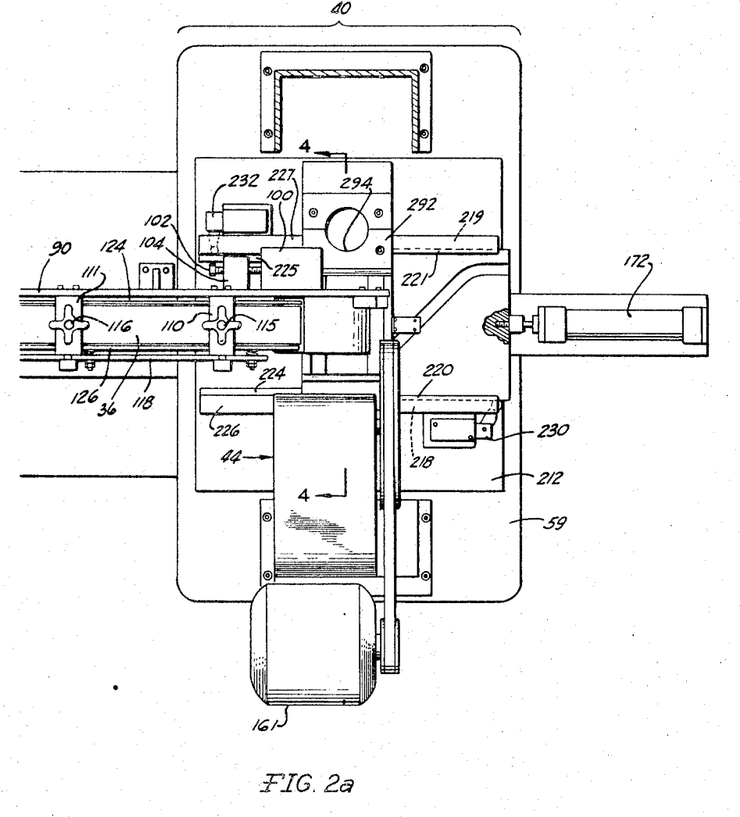
FIGURES 2a and 2b are a top view of the machine illustrated in FIG. 1 with one of the presses removed.
Figure 2B:
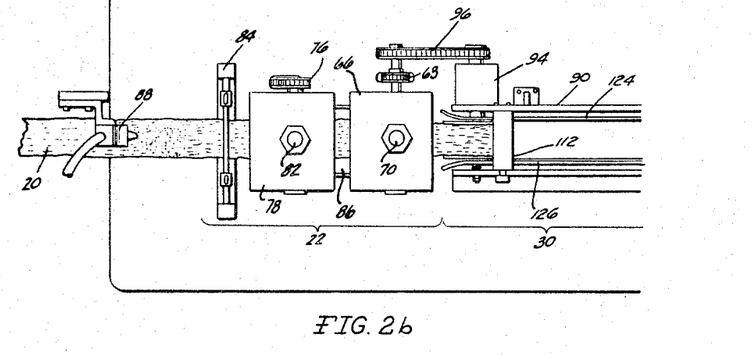
Figure 3:
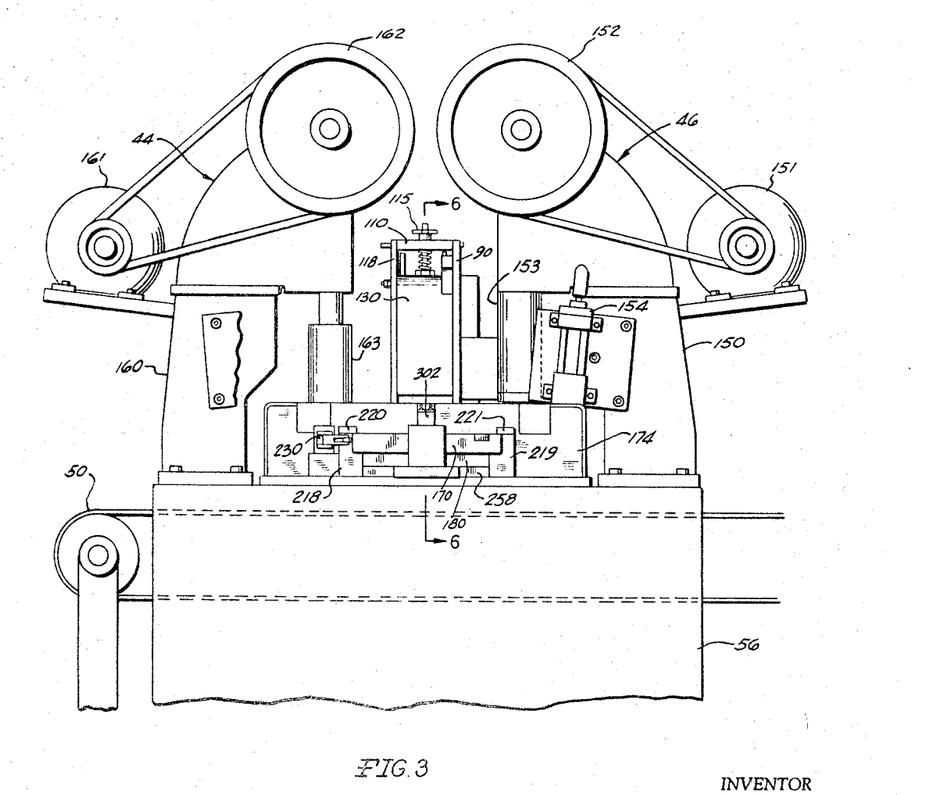
FIGURE 3 is an end view of the machine taken from the right as viewed in FIG. 1 with both presses being illustrated and certain parts broken away.

Referring to FIGS. 1–3 and the overall organization and operation of a machine constructed in accordance with the present invention, a continuous ribbon 20 of steel wool is supplied from a large storage roll (not shown) to a first station 22 where four toothed rollers 24, 25, 26, 27 tear ribbon 20 into strips 28. The strips 28 are fed by rollers 26, 27 to a second station 30 where they are rolled into individual rolls 32 between an endless belt 34 and an inclined pressure plate 36. Rolls 32 have a rectangular longitudinal cross section when they leave station 30. Rolls 32 from station 30 then pass to a third station 40 where they are compressed and pinched into finished pads 42 (FIG. 4) by alternately-actuated punch presses 44, 46 (FIG. 3) having die sets and die actuators indicated generally by numerals 48 and constructed in accordance with one important aspect of the present invention. Pads 42 have a circular cross section and a pinched peripheral margin 49 when they leave station 40. The machine is illustrated with press 44 removed in FIG. 1 and with press 46 removed in FIG. 2b. Finished pads 42 ejected from the die sets and actuators 48 fall onto an endless belt conveyor 50.

More particularly the machine comprises a base 54 which supports vertical frame and housing members 56 and an upper bed 58 having a downwardly stepped end portion 59, the right end portion as viewed in FIG. 1. Mounted on base 54 is a motor 59a which drives roller 27 through a gear box 60 and a chain drive including a chain 61, a drive gear 62, and a chain 63. Roller 27 is journaled in an inverted U-shaped support 66 fastened on bed 58. Roller 26 is journaled in a carriage 68 that is urged downwardly in support 66 by a spring biased screw 70. Motor 59a also drives roller 25 through gear drive 60, gear 62, a Geneva driver 72, a Geneva wheel 73, a chain 74, gears 75 and a chain 76. Roller 25 is journaled in an inverted U-shaped support 78 fastened on bed 58 with roller 24 being journaled in a carriage 80 that is urged downwardly in support 78 by a spring biased screw 82. Ribbon 20 is fed to rollers 24, 25 through a guide 84 mounted on bed 58 and from rollers 24, 25 to rollers 26, 27 through a transfer channel 86. Before entering station 22, ribbon 20 may be sprayed with liquid soap by means of a nozzle 88. The Geneva driver 72 and wheel 73 cause rollers 24, 25 to rotate intermittently while rollers 26, 27 are rotating continuously so that strips 28 are torn from ribbon 20 when rotation of rollers 24, 25 is interrupted by the intermittent operation of driver 72 and wheel 73. While rollers 24, 25 are driven they rotate at the same speed as rollers 26, 27. Tearing of ribbon 20 into the individual strips 28 is preferred, as contrasted to cutting, since individual fibers of ribbon 20 will tear at random positions, tapering the ends of strips 28 to facilitate a smooth uniform outer convolution in rolls 32. Strips 28 are fed to station 30 by rollers 26, 27 through a transfer channel (not shown).

Station 30 comprises a main vertical support bracket 90 located toward the rear of the machine as viewed in FIG. 1, and fastened at its lower end on bed 58. Mounted on one end of bracket 90 adjacent station 22, the left end of bracket 90 as viewed in FIG. 1, is a drive drum 92 journaled on bracket 90 by a bearing 94 fastened on the rear of bracket 90. Drum 92 is driven by roller 27 through a chain 96. A second drum 98 is journaled on the other end of bracket 90 by a bearing 100 mounted on bracket 90 for limited horizontal movement and adjustable horizontally by means of a screw 102 threaded in a block 104 which is fastened on bracket 90. Belt 34 is supported on drums 92, 98 and is revolved by drum 92. A flat plate 106 (FIG. 6) fastened on bracket 90 extends horizontally between drums 92, 98 beneath belt 34 to support the belt between the drums. Three spaced blocks 110, 111, 112 (FIGS. 2a and 2b) are fastened at their rear ends on bracket 90 and project toward the front of the machine over belt 34. Pressure plate 36 is supported on blocks 110, 111 by spring biased screws 114, 115 to urge plate 36 downwardly toward belt 34. By adjusting screws 114, 115 the inclination of plate 36 and the pressure exerted by the plate can be varied to select the size and density of rolls 32 formed from strips 28 between belt 34 and plate 36. Also fastened on bracket 90 adjacent the leading end of plate 36, the left end as viewed in FIG. 1, is a spring leaf 116 which projects downwardly toward belt 34. Leaf 116 catches and folds back a leading edge on each strip 28 as it enters the space between belt 34 and plate 36 to start the strip into a roll.

Releasably fastened on the front of blocks 110, 111, 112 and disposed in front of belt 34 is a swing plate 118 having downwardly depending legs 119 hinged at their lower ends on bed 58 so that plate 118 can be opened for access to the belt 34 and the plate 36. Pressure plate 36 and the upper run of belt 34 are flanked by a pair of lateral guides 124, 126 which extend vertically from belt 34 beyond plate 36 and horizontally between and beyond drums 92, 98. Guides 124, 126 retain strips 28 and rolls 32 properly positioned between belt 34 and plate 36 while rolls 32 are being formed. Guide 124 is fastened on bracket 90 whereas guide 126 is adjustably mounted on the swing plate 118 so that the space between guides 124, 126 can be varied when desired. A curved plate 130 (FIGS. 1 and 6) is mounted on bracket 90 at the outlet end of station 30, the right end as viewed in FIGS. 1 and 6, to direct rolls 32 downwardly from belt 34 to the die sets and actuators 48 in station 40. Plate 130 is spaced radially outwardly from drum 98 with a curved side plate 140 fastened on the front side of plate 130 to close the space between plate 130 and drum 98. Adjacent drum 98 and the lower end of plate 140 is a spring leaf 134 fastened at one end end on bracket 90 with its free end extending toward plate 130 to engage rolls 32 slightly as they pass from station 22. Leaf 134 slows down the rolls 32 to minimize bouncing when they hit the die sets and actuators 48.

Referring to station 40, punch press 46 is mounted on the bed portion 59 at the right side as viewed in FIG. 3 by a vertical pedestal 150 fastened on portion 59. Press 46 is driven by a motor 151 connected to a flywheel 152 for reciprocating a vertically movable punch 153 when an air valve 154 (FIGS. 3 and 10) is tripped. Mounted on the lower end of punch 153 is a punch die 155 (FIG. 4) fashioned with a circular die cavity 156 which opens in a downwardly direction. Punch 44, the left hand punch as viewed in FIG. 3, is mounted on bed portion 59 by a vertical pedestal 160 and is driven by a motor 161 connected to a flywheel 162 to reciprocate a vertically movable punch 163 when press 44 is tripped by an air valve 164 (FIG. 10) also mounted on pedestal 160. A punch die 165 mounted on the lower end of punch 163 is fashioned with a circular die cavity 166 which opens in a downwardly direction. In general one of the rolls 32 from station 30 is formed by press 44 into a finished pad 42 and then the next or second roll received from station 22 is formed by press 46.

Figures 6, 7A, 7B:
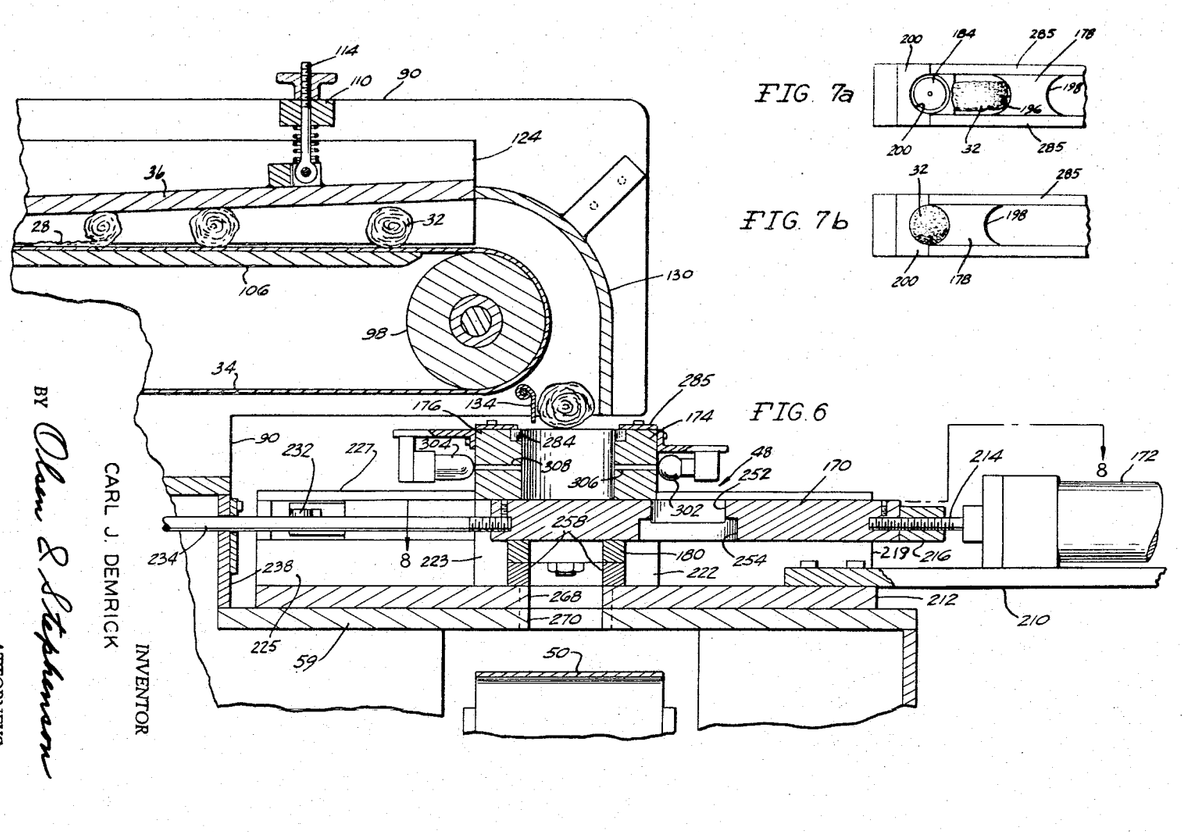
FIGURE 6 is an enlarged fragmentary vertical section taken on line 6—6 of FIG. 3 to further illustrate the operation and construction of the die sets and actuators.
FIGURES 7a and 7b are fragmentary horizontal sections to further illustrate the operation of the shuttle die for initially forming the roll into an intermediate pad prior to final compressing and pinching of the pad.
Figure 8:
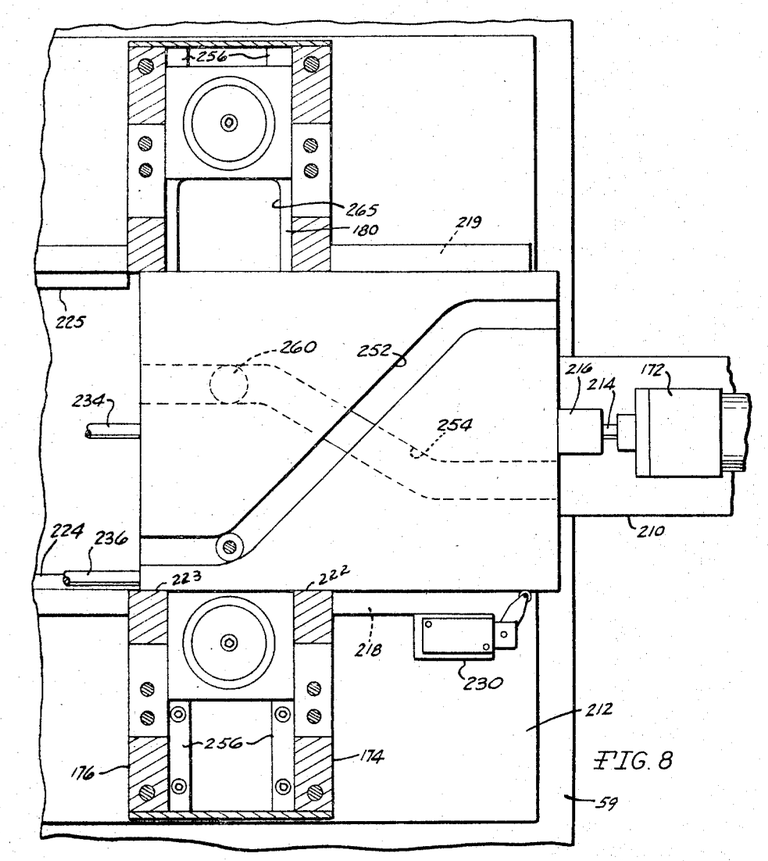
FIGURE 8 is a horizontal section taken on line 8—8 of FIG. 6.
Figure 9:
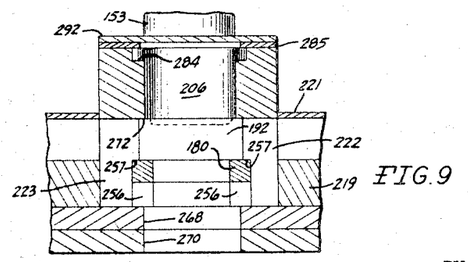
FIGURE 9 is a vertical section taken on line 9—9 of FIG. 4.

Referring to FIGS. 4–9, the die sets and die actuators 48 generally comprise a cam plate 170 which is reciprocated by an air cylinder 172 in opposite longitudinal directions, from right to left and from left to right as viewed in FIGS. 2b, 6 and 8. Plate 170 extends slidably through a pair of spaced vertical frames 174, 176 and is arranged to shift a lateral die shuttle 178 disposed between frames 174, 176 above cam plate 170 and a die plate 180 disposed between frames 174, 176 below the cam plate 170. Shuttle 178 and plate 180 are shifted simultaneously but in opposite lateral directions as viewed in FIG. 4 by plate 170. A die 182 having a generally circular die cavity 184 is mounted on one end, the left end as viewed in FIG. 4, of plate 180 by a die shoe 186 fastened on plate 180. A second die 188 having a generally circular die cavity 190 is mounted on the opposite end of plate 180 by a die shoe 192 also fastened on plate 180. Shuttle 178 has a first die face 196 concaved inwardly at one end and a second die face 198 concaved inwardly at the opposite end. Spaced laterally outwardly of face 196 and fastened on frames 174, 176 is a first fixed lateral die 200 having a concave die face 202 which cooperates with the face 196 on shuttle 178 when the shuttle is shifted to the left. A second fixed lateral die 204 is fastened on frames 174, 176 at the opposite side and is fashioned with a concave face 206 which cooperates with face 198 on shuttle 178 when the shuttle is shifted to the right. In general when a roll 32 is received from station 30 between shuttle 178 and one of the fixed lateral dies 200, 204, the shuttle is shifted laterally by cam plate 170 to initially form the roll between the shuttle and the lateral die. Simultaneously cam plate 170 shifts die plate 180 to position the corresponding lower die 182, 188 beneath the corresponding one of the punches 163, 153, so that after the roll is formed initially by shuttle 178 and the corresponding punch is actuated, the roll is pressed and pinched into a finished pad by the punch.

Referring to the construction of the die sets and die actuators 48 in greater detail, cylinder 172 is mounted on a bracket 210 which in turn is fastened on a sub-base 212 fastened on bed portion 59. Cylinder 172 has a piston rod 214 threaded in one end, the right end as viewed in FIG. 6, of cam plate 170. A rubber bumper 216 is disposed on rod 214 between plate 170 and cylinder 172. Plate 170 rides in a pair of square-guide blocks 218, 219 (FIGS. 2b, 3 and 8) fastened on place 212 with plate 170 being retained in the guide blocks by a pair of rails 220, 221, respectively. Each of the frames 174, 176 has a large generally rectangular cutout 222, 223, respectively, to accommodate cam plate 170 for sliding movement therethrough. Fastened on sub-base 212 on the left side of frame 176 opposite cylinder 172 are a second pair of guide blocks 224, 225 having rails 226, 227 for slidably supporting and guiding plate 170 when it is moved toward the left from its position illustrated in FIG. 6. A first limit switch 230 (FIGS. 8 and 11) fastened on block 218 is actuated by cam plate 170 when the plate is in its extreme right position as viewed in FIG. 8. A second limit switch 232 fastened on guide block 225 is actuated by cam plate 170 when the plate has moved to its extreme left position as viewed in FIGS. 6 and 8. Fastened in the end of plate 170 opposite cylinder 172 are a pair of rods 234, 236 (FIG. 8) which extend outwardly from the plate in a direction toward the left as viewed in FIG. 6 through a vertical guide plate 238. Rod 234 is fastened at its other end to an air cylinder 240 (FIG. 1) which serves as a damper for plate 170 when it is reciprocated by cylinder 172. The extension of rod 236 is slidably supported on bed 58 by a bushing 242 (FIG. 1). A stop 244 (FIGS. 1 and 10) fastened on rod 236 is disposed to operate an arm 245 of an air valve 246 when cylinder 172 is retracted and cam plate 170 is in its extreme right position illustrated in FIG. 6. A second air valve 248 having an actuating arm 249 is mounted on frame 56 and disposed to be actuated by stop 244 when plate 170 has been shifted to its extreme left position. Valves 246, 248 trip presses 44, 46, respectively. Cam plate 170 is fashioned with an upper cam slot 252 for shifting shuttle 178 and a lower cam slot 254 for shifting die plate 180.

Figure 4:
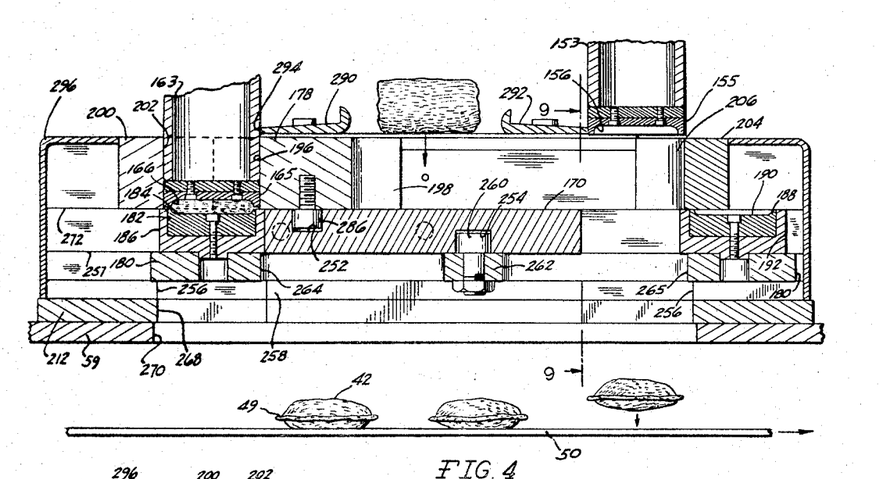
FIGURE 4 is a vertical section taken on line 4—4 of FIG. 2 to further illustrate the construction and operation of the presses and the die sets and actuators including a laterally shiftable shuttle die, a sliding lower die plate and a longitudinally shiftable cam plate for actuating the shuttle and the die plate.
Figure 5:
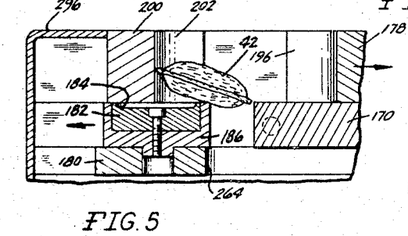
FIGURE 5 is a fragmentary vertical section of one die set with the parts shifted from the position illustrated in FIG. 4 to eject a finished pad from the die set.

Plate 180 is dimensioned to fit closely and slidably in frames 174, 176 and is slidably supported by four wear plates 256 disposed beneath plate 180 in pairs at opposite ends of plate 180 and fastened on sub-base 212. Frames 174, 176 each have a longitudinal shoulder 257 (FIG. 9) which is stepped inwardly to overlie and guide plate 180. Plate 180 is also slidably supported by a pair of longer wear plates 258 disposed centrally of the plate and fastened on sub-base 212. A cam follower pin 260 fastened on a central disposed web 262 of plate 180 projects upwardly into and engages with the cam slot 254 in plate 170. Web 262 is flanked by two rectangular cutouts 264, 265 which extend longitudinally of plate 180 and terminate adjacent die shoes 186, 192, respectively, to serve as outlets when finished ones of the pads 42 are ejected from dies, 182, 188. For example, as illustrated in FIG. 4, when plate 180 is shifted to its extreme right position aperture 265 is disposed beneath punch 153 whereas when the plate 180 is shifted to its extreme left position aperture 264 will be disposed beneath punch 163. Sub-base 212 and bed portion 59 have elongated openings 268, 270 which extend laterally outwardly beyond punches 153, 163 so that pads are free to drop through apertures 264, 265 onto conveyor 50 when pads are ejected from dies 182, 188. Die shoes 186, 192 ride in a guide formed by an inwardly stepped shoulder 272 extending longitudinally of each frame 174, 176.

Shuttle 178 is dimensioned to fit closely and slidably in frames 174, 176 and is fashioned with upper lateral flanges (not shown) which ride in guides 284 (FIG. 9) on frames 174, 176 and are retained in place by rails 285. A cam follower pin 286 threaded in shuttle 178 depends downwardly into and in engagement with the cam slot 252 on cam plate 170. As shown in FIGS. 4 and 7a and 7b, faces 196, 198 are concaved inwardly of shuttle 178 with a semi-circular configuration. Face 202 on the fixed lateral die 200 is also concaved inwardly of die 200 so that when shuttle 178 shifts to its extreme left position and bottoms on die 200 as shown in FIGS. 4 and 7b, faces 196, 202 form a vertically disposed receptacle in line with punch 163 and having a circular horizontal cross section. Similarly when shuttle 178 is shifted to its extreme right position against die 204, faces 198, 206 form a vertically disposed receptacle in line with punch 153. Slot 254 is contoured relative to slot 252 such that die plate 180 reaches its limit of travel before shuttle 178 bottoms on dies 200, 204 and shuttle 178 starts retracting from dies 200, 204 before die plate 180 begins shifting to eject finished pads 42. The space between frames 174, 176 is partially closed at the top by a pair of spaced-apart plates 290, 292 each of which has a semi-circular cutout 294 in line with one of the punches 163, 153. Plates 290, 292 guide rolls 32 from station 22 as they drop downwardly between plates 290, 292 against plate 170 and then assist in feeding the rolls toward dies 200, 204 when the rolls are pushed outwardly by shuttle 178. Suitable end covers 296 are fastened on frames 174, 176 at opposite ends.

A photoelectric unit 200 (FIG. 11) includes a light bulb 302 (FIG. 6) mounted on frame 174 and a photocell 304 mounted on frame 176. Bulb 302 and photocell 304 are disposed centrally of frames 174, 176, above plate 170 and vertically in line with the longitudinal axis of belt 34 and the outlet of station 30. Frames 174, 176 are provided with passageways 306, 308, respectively, in line with the bulb 302 and photocell 304 so that a roll 32 dropping from station 22 against plate 170, breaks a light beam between bulb 302 and photocell 304 to actuate piston 172.

Figure 10:
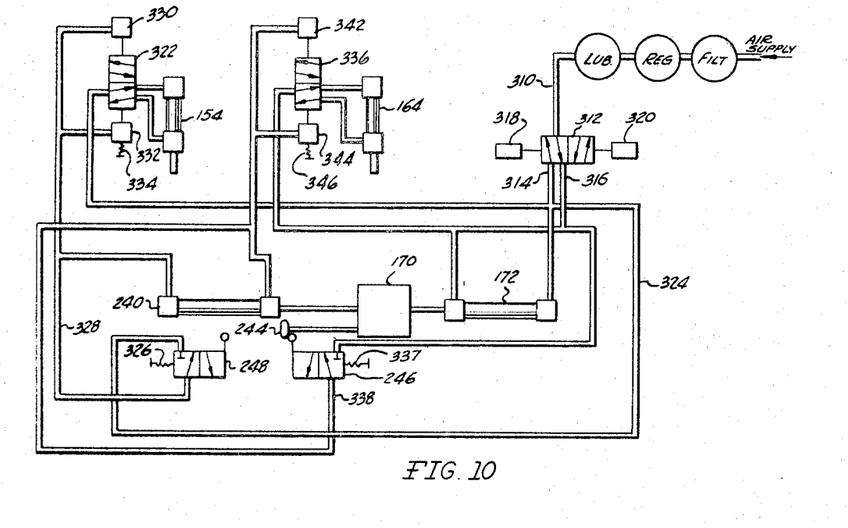
FIGURE 10 is a schematic diagram illustrating the pneumatic system for operating the cam plate and the presses.
Figure 11:
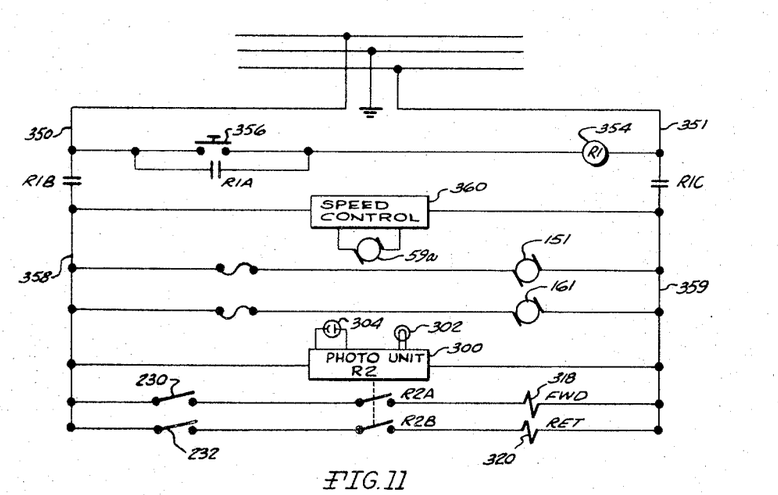
FIGURE 11 is a schematic diagram illustrating the electrical circuit for operating the cam plate and presses in response to a pad being received in the die sets.

Referring to the pneumatic circuit illustrated in FIG. 10, an air supply line 310 is connected to a four-way air valve 312 having a pair of outlet lines 314, 316. Valve 312 is arranged to be shifted in opposite directions by a pair of solenoids 318, 320 (FIGS. 10 and 11) to selectively connect line 310 to line 314 or to 316. Line 314 is connected to one end of cylinder 172 for operating cylinder 172 from a retracted to a forward position, toward the left as viewed in FIGS. 6 and 10. Line 314 is also connected to an air valve 322 which controls the cylinder 154 (FIGS. 3 and 10) of press 46. Line 314 is also connected by a line 324 to the inlet of valve 248 (FIGS. 1 and 10) which is normally biased to an open position, as shown, by a spring 326. Valve 248 has an outlet line 328 connected to a pair of air actuators 330, 332 for valve 322 and to one side of cylinder 240. Valve 322 is normally biased to the position illustrated by a compression spring 334 so that line 314 is normally connected to cylinder 154 to main cylinder 154 extended. Actuator 332 includes a suitable control valve so that an initial surge in line 328 operates actuator 330 but not actuator 332 to shift valve 322 and thus retract cylinder 154 which in turn trips punch 46. Almost instantaneously actuator 332 balances actuator 330 so that spring 334 shifts valve 322 back to the illustrated condition and continued cycling of press 46 is prevented. Line 316 from valve 312 is connected to the other side of cylinder 172 to retract the cylinder and to an air valve 336 which operates cylinder 164 on press 44 (FIG. 3). Line 316 is also connected to valve 246 which is normally biased to the position illustrated by a spring 337. Valve 246 has an outlet line 338 connected to a pair of actuators 342, 344 for valve 336 and to the other side of piston 240. Valve 336 is normally biased to the position illustrated by a compression spring 346 with actuator 344 having a suitable control valve such that cylinder 164 receives one shot of air through valve 336 to operate press 44 through one cycle when valve 246 is tripped by stop 244.

The electrical circuit (FIG. 11) for the machine illustrated in FIGS. 1–9 includes a pair of main supply conductors 350, 351 with a start relay 354 connected across lines 350, 351 by a start switch 356. Relay 354 has one contact R1A which seals relay 354 and two contacts R1B, R1C which connect conductors 350, 351 to conductors 358, 359, respectively. A speed control 360 for motor 59a (FIG. 1) is connected across lines 358, 359 as are motors 151, 161. Also connected across lines 358, 359 is the photoelectric unit 300 which includes a relay R2 having two contacts R2A, R2B normally open when lines 358, 359 are energized and light from bulb 302 impinges on photocell 304. Solenoid 318 (FIGS. 10 and 11) is connected across lines 358, 359 through contacts R2A and limit switch 230 (FIG. 2b) whereas solenoid 320 is connected in series across lines 358, 359 through contacts R2B and limit switch 232.

Referring to the operation of the machine described in connection with FIGS. 1–11, when motor 59a is energized by closing switch 356, rollers 24, 25, 26, 27 will be operated to draw ribbon 20 through station 22 with liquid soap being sprayed on the ribbon prior to its entry into station 22 if desired. Intermittent rotation by rollers 24, 25 while rollers 26, 27 are rotating continuously causes ribbon 20 to be separated into strips 28 which are fed from station 22 onto belt 34 in station 30. The leading edge, the right edge as viewed in FIG. 1, of strips 28 are caught by leaf 116 to initiate forming of strip 28 into a roll. As strips 28 continue to move on belt 34 toward the right as viewed in FIG. 1, the strips will be coiled by pressure plate 36 into rolls 32 as they progress toward the outlet end, the right end, of station 22. Rolls 32 leave station 22 through the guide formed by plates 130, 132 and are engaged slightly by spring leaf 134 so that they drop gently onto the cam plate 170 in station 40.

Assuming cylinder 172 is an extended position, that is, the cylinder 172 and cam plate 170 are in an extreme position in a direction toward the left as viewed in FIG. 6, shuttle 178 will be in its extreme right position as viewed in FIG. 4 whereas the die plate 180 will be in its extreme position to the left. When a roll 32 drops from station 30 between face 196 on the shuttle 178 and face 202 on the lateral die 200 the light beam between bulb 302 and photocell 304 is broken to operate relay R2 (FIG. 11) which closes contacts R2A, R2B. Since cam plate 170 is an extreme position to the left as viewed in FIGS. 2b, 6 and 8, limit switch 232 (FIGS. 2b and 11) is engaged by plate 170 and closed to complete the circuit through solenoid 320. Solenoid 320 shifts valve 312 to the right position illustrated in FIG. 10 to connect line 310 with line 316 actuating air cylinder 172 to retract plate 170 in a direction toward the right as viewed in FIGS. 2b, 6 and 8. With line 316 connected to line 310, air supplied to valve 336 maintains cylinder 164 in the position illustrated and readies valve 336 to trip press 44 when the actuators 342, 344 are energized. As plate 170 moves toward the right as viewed in FIG. 6, shuttle 178 is shifted toward the left as viewed in FIG. 4 by slot 252 and follower pin 286 toward die 200 with one of the rolls 32 sandwiched between faces 196, 202. Shifting of cam plate 170 toward the right as viewed in FIG. 6 also shifts die plate 180 toward the right as viewed in FIG. 4 to move die 182 into position below punch 163. When plate 170 reaches its extreme position to the right as viewed in FIG. 6, stop 244 (FIG. 1) trips the air control valve 246 and plate 170 trips limit switch 230. Valve 246 is shifted by stop 244 against spring 337 to connect its outlet line 338 to the supply line 310 through line 316 and valve 312. With plate 170 in its extreme position to the right, shuttle 178 is bottomed on die 200 so that roll 32 has been formed laterally, along its horizontal axis, from a rectangular shape to the rough shape of a round pad. When valve 246 is operated by stop 244, valve 336 is shifted by actuator 342 to retract cylinder 164 and trip punch 44. Cylinder 240 is also connected to the air supply line 310 by valve 246 to damp the motion of cylinder 172 and cam plate 170. Punch 163 travels downwardly to press roll 32 between dies 165, 182 and simultaneously crimp or pinch margin 49 to form a finished pad 42. Punch 163 is then retracted as press 44 completes its cycle.

When the next pad from station 30 is received in station 40 between shuttle 178 and die 204, photoelectric unit 300 again operates to close contacts R2A, R2B. With cam plate 170 in the retracted position, limit switch 230 is closed so that solenoid 318 shifts valve 312 to the left to connect line 310 with line 314. Cylinder 172 moves cam plate 170 in a direction toward the left as viewed in FIGS. 2b, 6, 8 and 9. Cam plate 170 simultaneously shifts shuttle 178 in a direction toward the right and die plate 180 in a direction toward the left as viewed in FIGS. 4 and 5. When shuttle 178 and plate 180 are shifted in opposite directions, a finished pad 42 resting in die 182 will ride out of the die cavity 184 and drop through aperture 264 and outlet openings 268, 270 onto conveyor 50. By simultaneously shifting shuttle 178 and die plate 180 in opposite directions the finished pad is not confined and moves freely out of die 182. This arrangement eliminates ejecting a finished pad from a confined die where it was not uncommon in prior art devices that the ejecting mechanism would catch or otherwise engage the finished pad creating tails or loose strands. As plate 170 continues to move in a direction toward the left as viewed in FIG. 6, shuttle 178 is shifted to the right as viewed in FIG. 4 while die 188 is moved into position under punch 153. Faces 198, 206 initially form the second roll into a rough pad when plate 170 reaches its extreme left position. When stop 244 trips 248, press 46 will be tripped by cylinder 154. Punch 153 descends to form a second finished pad between dies 155, 188.

Presses 44, 46 will continue to operate alternately in the above-described manner as pads continue to drop from station 30 onto plate 170 and actuate the photoelectric unit 300. By actuating the cam plate 170 in response to the receipt of a roll in station 40 no critical timing between forming a roll in station 30 and operating the presses 44, 46 in station 40 is required. With the double ended shuttle 178 combined with extremely rapid action of cam plate 170 and presses 44, 46, station 40 is always in condition to receive a roll 32 from station 30. By feeding the rolls 32 with shuttle 178 into position for the pressing operation and simultaneously rough forming the roll there is little possibility that individual strands of steel wool will be pulled into loose tails and detract from the appearance and utility of the finished pads. Excessive handling of the finished pads 42 during ejection from dies 182, 188 is also eliminated.

It will be understood that the apparatus for making steel wool pads which are herein described and disclosed are presented for purposes of explanation and illustration and are not intended to indicate limits of the invention, the scope of which is defined by the following claims.

What is claimed is:

1. In an apparatus for making steel wool pads or the like, the combination comprising feeding means for receiving a continuous ribbon of steel wool fibers, separating means for intermittently tearing said ribbon into strips of substantially equal lengths, rolling means for receiving said strips in succession from said separating means and for forming each strip into a roll, and a die set arranged and adapted to receive one of said rolls from said rolling means and form said one roll into a pad comprising horizontally opposed dies relatively movable in a horizontal direction between an open position and a closed position, said dies forming a vertically disposed receptacle open at its upper and lower ends when said dies are in said closed position, said dies being arranged and adapted to receive said one roll between said dies when said dies are in said open position, and said die set further comprising vertically opposed dies relatively movable in a vertical direction between open and closed positions, said vertical dies being disposed vertically in line with said receptacle when said vertical dies are in their open position and said horizontal dies are in said closed position.

2. The apparatus set forth in claim 1 further comprising actuating means operable in response to receipt of said one roll between said horizontal dies to move said horizontal dies to their closed position with said one roll being disposed in said receptacle and between said vertical dies, and then move said vertical dies to their closed position to compress said roll.

3. In combination means for forming first and second rolls from a substantially continuous ribbon of fibrous material and means for forming said rolls into a first pad and a second pad comprising a pair of die sets each having opposed upper and lower dies and opposed lateral dies, said die sets being disposed side-by-side with one lateral die in one set being back-to-back with one lateral die in the other set, and a shuttle member mounted between said die sets for shiftable movement in opposite lateral directions, said one lateral die in said one set being on one end portion of said shuttle member and said one lateral die in the other set being on an opposite end portion of said shuttle member whereby said shuttle member may be shifted in one lateral direction with said first roll disposed between said lateral dies in said one set to close said lateral dies in said one set while simultaneously opening said lateral dies in said other set to receive said second roll between said lateral dies in said other die set.

4. In a press having a pair of die sets operated alternately, each of said die sets having opposed upper and lower dies and opposed lateral dies, that improvement wherein said die sets are disposed side-by-side with one lateral die in one set being adjacent one lateral die in the other set, and a shuttle member mounted between said die sets for shiftable movement in opposite lateral directions, said one lateral die in one set being on one end portion of said shuttle member and said one lateral die in the other set being on an opposite end portion of said shuttle member whereby when said shuttle shifts in one lateral direction said lateral dies in said one set close and said lateral dies in said other set open.

5. In combination means for forming a plurality of rolls from a substantially continuous ribbon of fibrous material and means for forming each of said rolls into a pad comprising first and second opposed dies normally spaced apart in a horizontal direction and being relatively movable in a horizontal direction between an open position and a closed position, said first and second dies having opposed faces arranged and adapted to form a receptacle when said first and second dies are closed, third and fourth opposed dies normally spaced apart in a vertical direction and being relatively movable in a vertical direction between an open position and a closed position, said third and fourth dies being vertically in line with said receptacle when said first and second dies are in said closed position, first means for moving said first and said second dies from said open to said closed position, second means for moving said third and said fourth dies from said open to said closed position, first control means operable in response to one of said rolls disposed between said first and second dies in their open position for actuating said first moving means, and second control means operable when said first and second dies are in their closed position to actuate said second moving means.

6. In a machine for use in forming rolls of steel wool or the like into pressed pads the combination comprising a first stationary wall having a first concavity which opens in a first horizontal direction, a second stationary wall spaced from said first wall in said first direction and having a second concavity which opens in an opposite horizontal direction toward said first concavity, a shuttle mounted for horizontal movement between said walls and having a third and fourth concavity, said third concavity opening in said opposite direction toward said first concavity and cooperating with said first concavity to form a first open-ended receptacle when said shuttle is shifted in said opposite direction to a first position adjacent said first wall, said fourth concavity opening in said first direction toward said second concavity and cooperating with said second concavity to form a second open-ended receptacle when said shuttle is shifted in said first direction to a second position adjacent said second wall, a die plate slidably mounted below said shuttle for horizontal movement in said first and said opposite directions between first and second positions, first and second lower dies mounted on said die plate and spaced horizontally along said die plate, said first lower die being vertically in line with said first receptacle when said die plate is in said first position, said second lower die being vertically in line with said second receptacle when said die plate is shifted to said second position, first and second upper dies, means mounting said first upper die for vertical movement along an axis extending through said first receptacle and means mounting said second upper die for vertical movement along an axis extending through said second receptacle.

7. The machine set forth in claim 6 further comprising actuating means operable when a first roll is disposed between said first and said second concavities and said shuttle is in said second position to shift said shuttle and said die plate to their first positions to initially form said first roll, move said first upper die downwardly to press said first roll between said first upper die and said first lower die and then raise said first upper die and then operable when a second roll is disposed between said third and fourth concavities to shift said shuttle and said die plate to their second positions to initially form said second roll, move said second upper die downwardly to press said second roll between said second upper die and said second lower die, and then raise said second upper die.

8. The machine set forth in claim 7 wherein said actuating means comprises a cam plate slidably mounted between said shuttle and said die plate for movement between first and second positions and operatively engaged with said shuttle and said die plate to substantially simultaneously shift said shuttle and said die plate to their first positions when said cam plate moves to its first position and to substantially simultaneously shift said shuttle and said die plate to their second positions when said cam plate moves to its second position.

9. The machine set forth in claim 6 wherein said die plate has first and second outlet apertures between said first and second lower dies, said first aperture communicating downwardly through said die plate adjacent said first lower die, said second aperture communicating downwardly through said die plate adjacent said second lower die and said die plate moves from its first position to its second position in said opposite direction while said shuttle moves from its first position to its second position in said first direction.

10. In an apparatus for making steel wool pads or the like, means for receiving a continuous ribbon of steel wool and for separating said ribbon into strips, means for forming each strip into an individual roll coiled about a longitudinal axis, a pair of lateral dies, each of said dies having a generally semi-circular concavity opening laterally toward the other die, said dies being laterally shiftable between open and closed positions and arranged to receive one of said rolls between said dies when said dies are open with the axis of said one roll extending in a direction between said concavities, said concavities forming a generally circular receptacle open at upper and lower ends when said dies are in said closed position to initially form said one roll in a direction along its axis, and a pair of vertically opposed dies relatively movable along a vertical axis extending through said receptacle for pressing said one roll in a direction perpendicular to said longitudinal axis while said one roll is retained between said lateral dies in their closed position.

No references cited.

RICHARD H. EANES, JR., *Primary Examiner.*